United States Patent
Shimizu

[19]

[11] Patent Number: 5,945,799
[45] Date of Patent: Aug. 31, 1999

[54] AUTOMATIC STEERING SYSTEM FOR VEHICLE

[75] Inventor: Yasuo Shimizu, Wako, Japan

[73] Assignee: Honda Giken Kogyo Kabushiki Kaisha, Tokyo, Japan

[21] Appl. No.: 08/948,245

[22] Filed: Oct. 9, 1997

[30] Foreign Application Priority Data

Oct. 9, 1996 [JP] Japan ................................. 8-268675

[51] Int. Cl.⁶ .................................................. B64C 13/18
[52] U.S. Cl. .............................. 318/587; 701/22; 701/41; 701/70
[58] Field of Search ................................. 318/580–587; 701/22, 23, 41, 51–56, 58–60, 70

[56] References Cited

U.S. PATENT DOCUMENTS

| | | | |
|---|---|---|---|
| 5,225,753 | 7/1993 | Koike et al. | 318/587 |
| 5,229,941 | 7/1993 | Hattori | 318/587 |
| 5,726,890 | 3/1998 | Takamoto et al. | 318/587 |

FOREIGN PATENT DOCUMENTS 3-74256  3/1991  Japan .
4-55168  2/1992  Japan .

*Primary Examiner*—David Martin
*Attorney, Agent, or Firm*—Nikaido, Marmelstein, Murray & Oram LLP

[57] ABSTRACT

An automatic steering system for a vehicle includes a memory section for storing data for a steering angle of a wheel with respect to a distance of movement of a vehicle in correspondence to four parking modes. If a desired parking mode is selected by a mode selecting switch, and the vehicle is moved in a creep travel while depressing a brake pedal, a control section controls the operation of a steering actuator to conduct automatic parking. When the driver releases his foot from the brake pedal during this time, the automatic parking control is canceled. When the automatic parking control is carried out, the driver's foot is necessarily on the brake pedal. Therefore, when the driver finds an obstacle, the brake can be immediately operated to stop the vehicle.

6 Claims, 8 Drawing Sheets

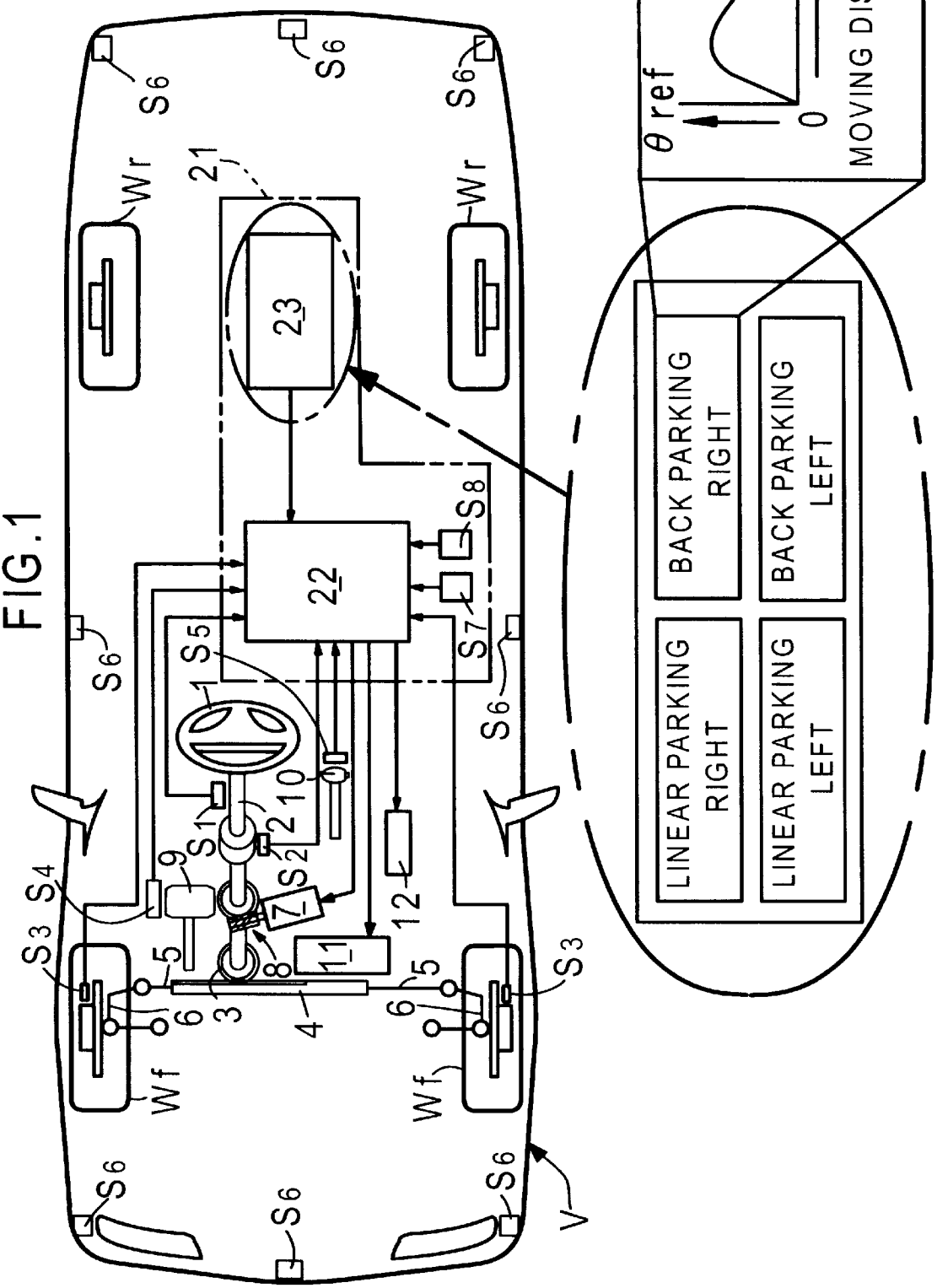

FIG. 2C
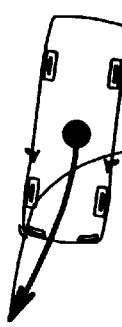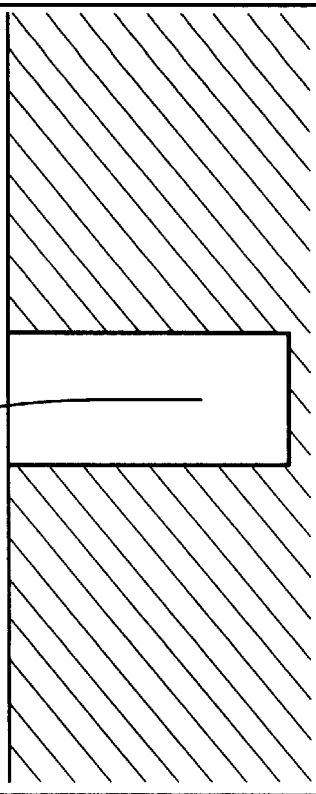
BACK PARKING/LEFT    START/FORWARD MOVEMENT
VOICE : PUSH START SWITCH
TAKE OFF BRAKE TO MOVE VEHICLE SLOWLY
BE CAREFUL SO THAT RIGHT FRONT BUMPER DOES NOT CONTACT OBSTACLE
FIG. 2D
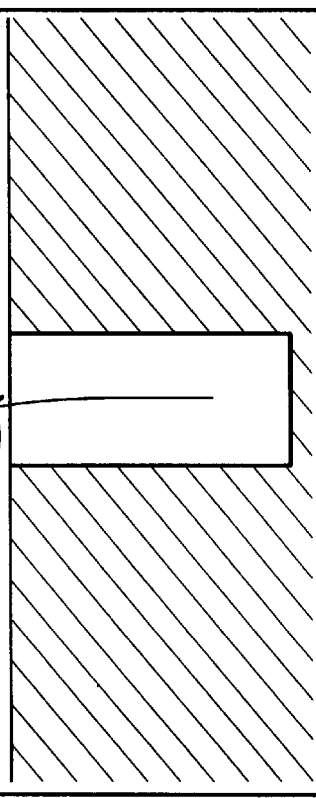
BACK PARKING/LEFT    FORWARD MOVEMENT /STOP PREPARATION
VOICE : BE CAREFUL SO THAT RIGHT FRONT BUMPER DOES NOT CONTACT OBSTACLE
PREPARE FOR STOPPING VEHICLE

BACK PARKING/LEFT    STOP/REVERSE

VOICE :STOP VEHICLE
BRING SELECT LEVER TO REVERSE POSITION

BACK PARKING/LEFT    STOP/BACKWARD MOVEMENT

VOICE : TAKE OFF BRAKE TO BACK VEHICLE SLOWLY
BE CAREFUL SO THAT LEFT REAR BUMPER
DOES NOT CONTACT OBSTACLE

VOICE :STOP VEHICLE
GARAGING HAS BEEN COMPLETED

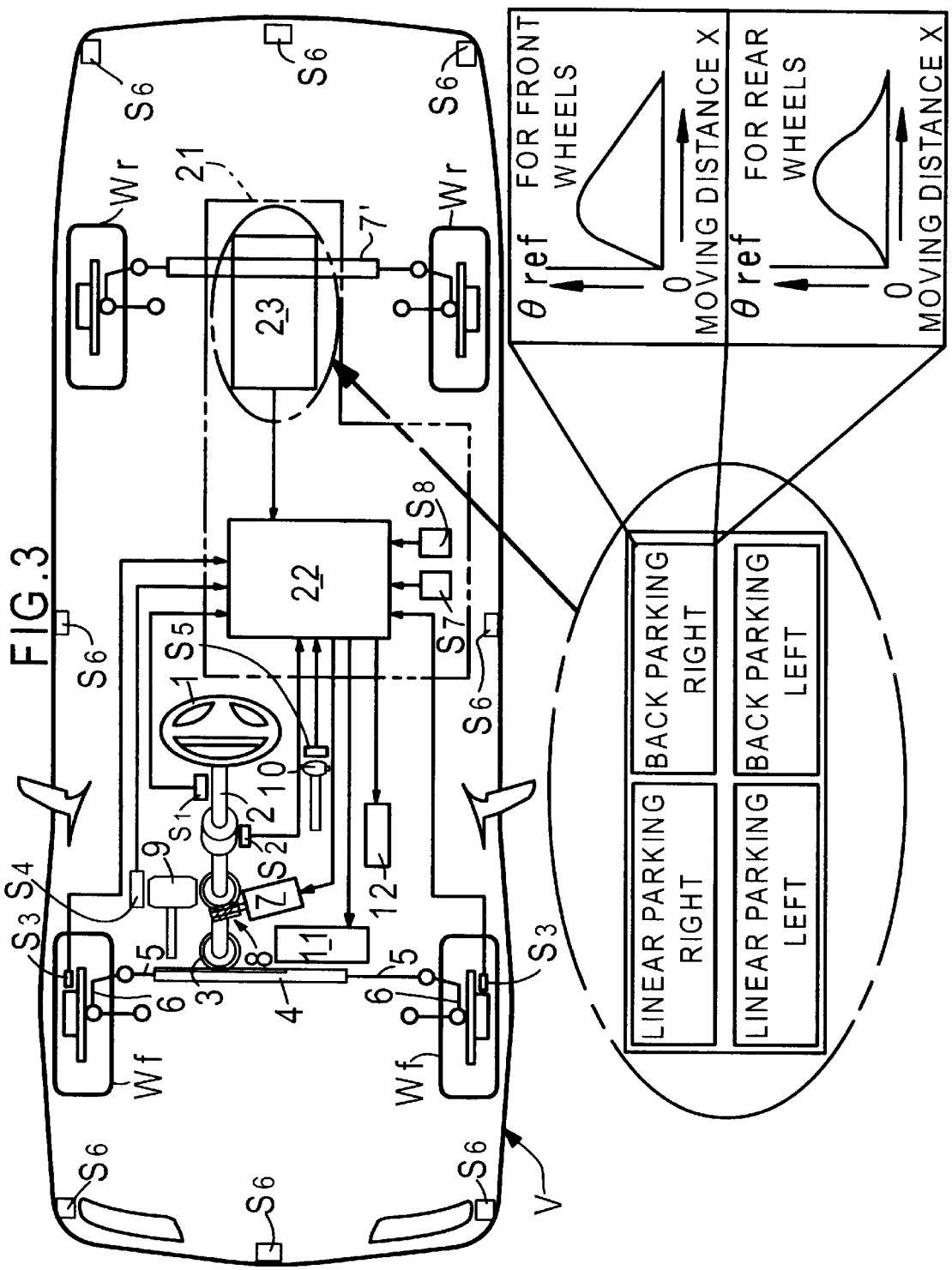

AUTOMATIC STEERING SYSTEM FOR VEHICLE

BACKGROUND OF THE INVENTION

1. Field of the Invention

The present invention relates to an automatic steering system for a vehicle, which is used for garaging the vehicle without recourse to steering by a driver.

2. Description of the Prior Art

Automatic steering systems for garaging a vehicle are known from Japanese Patent Application Laid-open No. 3-74256 and No. 4-55168. The automatic steering systems for vehicles utilize an actuator for a conventionally well-known electrical power steering device, and are designed so that the back parking and the linear parking are automatically performed by controlling the actuator based on the relationship between a distance of movement of the vehicle and a steering angle which have been previously stored.

In the prior art system, when the driver has operated a steering wheel with a torque equal to or larger than a predetermined value, and when the vehicle speed has been increased to or above a predetermined value, or when a switch has been turned OFF, the automatic parking control is canceled. A vehicle equipped with an automatic transmission is garaged utilizing a creep force and hence, even if the automatic parking control is canceled, for example, to keep away from an obstacle, the vehicle continues to travel. In this case, to avoid contact of the vehicle with the obstacle, it is necessary to immediately operate a brake to stop the vehicle. If the stopping of the vehicle is delayed after canceling the automatic parking control, the position of the vehicle is deviated from the previously stored intrinsic locus of movement of the vehicle and as a result, the subsequent re-execution of a garaging operation is complicated.

SUMMARY OF THE INVENTION

The present invention has been accomplished with the above circumstance in view, and it is an object of the present invention to ensure that the vehicle can be immediately stopped after canceling of the automatic parking control.

To achieve the above object, the control of the steering actuator based on the contents stored in the memory means, is carried out only when the driver is operating the brake commands means. Therefore, when the driver has found an obstacle during the automatic parking control, the brake command or input means can be immediately operated to stop the vehicle. When the driver abandons the parking of the vehicle during the automatic parking control, the automatic parking control is canceled only by stopping operation of the brake command means, leading to an enhanced operability.

In another feature of the present invention, the locus of movement of the vehicle is stored as the steering angle of the wheels with respect to the distance of movement of the vehicle. Therefore, even if the vehicle speed is varied during the automatic parking control, a given locus of movement can be always ensured.

In a further feature of the present invention, if the operation of the brake command means is discontinued during conduction of the automatic parking control based on the contents stored in the memory means, steering control is switched to the steering operation provided by the driver. Therefore, when the automatic parking control is canceled, steering control can be passed to the usual steering without any delay.

According to still another feature of the present invention, when the object detecting means has detected an object as an obstacle to the vehicle moving on the locus of movement, the automatic vehicle-stopping means automatically stops the vehicle. Therefore, it is possible to automatically avoid the contact of the vehicle with the object or obstacle during the automatic parking control.

According to a further feature of the present invention, the automatic vehicle-stopping means is associated with the brake means and therefore, when the object or obstacle has been detected, the vehicle can be reliably stopped.

According to another feature of the present invention, when the driver operates the brake command means or shifts the automatic transmission to the parking position, the operation of the automatic control is canceled. Therefore, the operation of the automatic vehicle-stopping means can be canceled without a special operation carried out by the driver. Further, even if the operation of the automatic vehicle-stopping means is canceled, the vehicle can immediately be prevented from moving.

According to a further feature of the present invention, the front and rear wheels are steered and therefore, it is possible to achieve a small sharp turn of the vehicle and thus, it is easy to park the vehicle in a narrow space.

BRIEF DESCRIPTION OF DRAWINGS

FIG. 1 is an illustration of an entire arrangement of a vehicle equipped with a first embodiment of steering control system of the present invention.

FIGS. 2C and 2D are illustrations for explaining the operation of "a start/forward movement stage" and "a forward movement/stop preparing stage".

FIG. 2I is an illustration for explaining the operation of "a completion/stop stage".

FIG. 3 is an illustration of an entire arrangement of a vehicle equipped with a front/rear wheel steering control system according to a second embodiment of the present invention.

DETAILED DESCRIPTION OF THE PREFERRED EMBODIMENTS

Figure 2A:
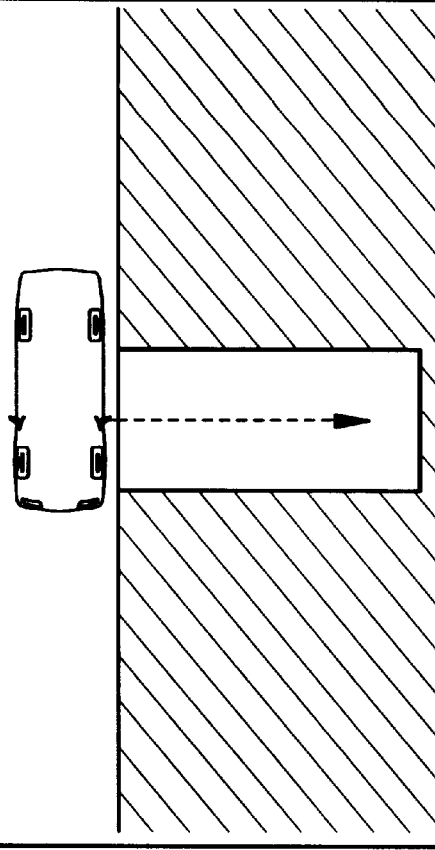
FIGS. 2A and 2B are illustrations for explaining the operation of a preparing stage for a back parking/left mode.

As shown in FIG. 1, a vehicle V includes a pair of front wheels Wf, Wf and a pair of rear wheels Wr, Wr. A steering wheel 1 and the front wheels Wf, Wf, which are the steering wheels, are interconnected by a steering shaft 2 which is rotated in unison with the steering wheel 1, a pinion 3 provided at a lower end of the steering shaft 2, a rack 4 meshed with the pinion 3, left and right tie rods 5, 5 mounted at opposite ends of the rack 4, and left and right knuckles 6, 6 connected to the tie rods 5, 5. To assist the operation of the steering wheel 1 by a driver, or to conduct an automatic steering for garaging the vehicle which will be mentioned later, a steering actuator 7 having an electric motor is connected to the steering shaft 2 through a worm gear mechanism 8.

A steering control unit 21 is comprised of a control section 22 and a memory section 23. Inputted to the control section 2 are signals from a steering angle detecting means $S_1$ for detecting a steering angle θ of the front wheels Wf, Wf based on a rotational angle of the steering wheel 1, a steering torque detecting means $S_2$ for detecting a steering torque of the steering wheel 1, front wheel rotational-angle detecting means $S_3$, $S_3$ for detecting steering angles of the left and right front wheels Wf, Wf, a brake-operation detecting means $S_4$ for detecting the operation (operational amount) of a brake pedal 9, a shift position detecting means $S_5$ for detecting a shift position (such as a "D" position, an "R" position, "N" position, "P" position and the like) selected by a select lever 10, and eight object detecting means $S_6$ mounted at a front portion, a central portion and a rear portion of the vehicle V. The object detecting means $S_6$ are any of a known sonar system, radar system, and/or television camera and the like. Lines connecting the object detecting means $S_6$ and the control section 22 are not shown for the purpose of preventing the complication of the drawings.

Further, a mode selecting switch $S_7$ and an automatic parking start switch $S_8$ operated by the driver, are connected to the control section 22. The mode selecting switch $S_7$ is operated to select any of four parking modes: a back-parking/right mode, a back-parking/left mode, a linear parking/right mode, and a linear parking/left mode. The automatic parking start switch $S_8$ is operated to start automatic parking in any mode selected by the mode selecting switch $S_7$.

Data for the four parking modes, i.e., relationships of reference steering angles θref to distances X of movement of the vehicle V are previously stored in the memory section 23. The distance X of movement of the vehicle V is calculated by multiplying the known peripheral length of the front wheel Wf by a rotational angle of the front wheel Wf detected by the front wheel rotational-angle detecting means $S_3$. Either one of a high-select value and a low-select value outputted from the pair of left and right front wheel rotational-angle detecting means $S_3$, $S_3$, and an average value of the high-select value and the low-select value is used for the calculation of the movement distance X.

The control section 22 controls the operation of the steering actuator 7, the operation of a brake actuator 12 (e.g., a hydraulic actuator for controlling the operations of brake cylinders for the front wheels Wf, Wf and the rear wheels Wr, Wr), and the operation of an operational stage display device 11 comprised of a liquid crystal monitor, based on the signals from the respective detecting means $S_1$ to $S_6$ and the switches $S_7$ and $S_8$ and the data for the parking modes stored in the memory section 23. The operational stage display device 11 includes a speaker for providing a voice instruction to the driver.

The operation of the embodiment of the present invention having the above-described arrangement will be described below.

When the vehicle is in a usual state in which the automatic parking is not used (when the automatic parking start switch $S_8$ is not in an ON state), the steering control unit 21 functions as a regular power-steering control unit. More specifically, when the steering wheel 1 is operated by the driver to turn the vehicle V, the steering torque detecting means $S_2$ detects a steering torque inputted to the steering wheel 1, and the control section 22 of the steering control unit 21 drives the steering actuator 7 based on the steering torque. As a result, the left and right front wheels Wf, Wf are steered by the driving force from the steering actuator 7, whereby the steering operation of the driver is assisted.

The contents of an automatic parking control will be described with the back parking/left mode (the mode in which the parking is conducted while the vehicle is being moved backwards to a parking position lying on the left side of the vehicle) as an example.

Figure 2B:
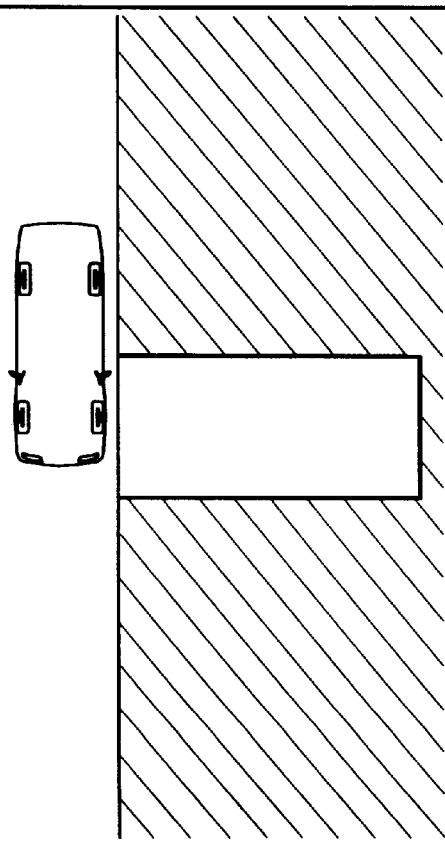

First, when the vehicle has reached a position near a garage where the vehicle is to be parked, the driver operates the mode selecting switch $S_7$ to select the back parking/left mode. Picture images of the garage and the vehicle and the words "back parking/left" which is the selected mode as well as letters of "preparation" which is the current stage are indicated on the operational stage display device 11 comprised of the liquid crystal monitor, as shown in FIG. 2A, and in addition to this, a voice instruction "put the left side of the vehicle as near as possible to an inlet line of the garage and stop the vehicle" is given through the speaker connected to the operational stage display device 11. Then, an instruction "stop the vehicle with a reference point matched with a center line of the garage" is given, as shown in FIG. 2B, whereby the driver stops the vehicle in such a manner that a predetermined reference point (e.g., the left side-mirror) is matched with the center line of the garage.

When the vehicle has been stopped at the start position, the current stage indicated on the operation-stage display device 11 is changed from "preparation" to "start/forward movement" as shown in FIG. 2C, and a presupposed locus of movement of the subject vehicle from the start position to a garaging-completed position is indicated, and in addition, voice instructions "push the start switch" and "take off the brake to move the vehicle slowly" are given from the speaker. When the driver has turned ON the parking start switch $S_8$ and taken off the brake pedal 9 to move the vehicle in a forward creep traveling manner, the front wheels Wf, Wf are automatically steered based on the data for the back parking/left mode selected by the mode selecting switch $S_7$, even if the driver does not operate the steering wheel 1.

More specifically, the control section 22 calculates a deviation E (=θref−θ) based on the reference steering angle θref in the back parking/left mode data read from the memory section 23 and the steering angle θ inputted from the steering angle detecting means $S_1$, and controls the operation of the actuator 7, so that the deviation E is brought to 0 (zero). At this time, the data of the reference steering angle θref is set to correspond to the distance X of movement of the vehicle and hence, even if there is a variation in vehicle speed in creep traveling, the vehicle is always moved on the above-described locus of movement. During this time, an instruction "be careful so that a right front bumper does not contact an obstacle" is given by the voice from the speaker.

Figure 2E:
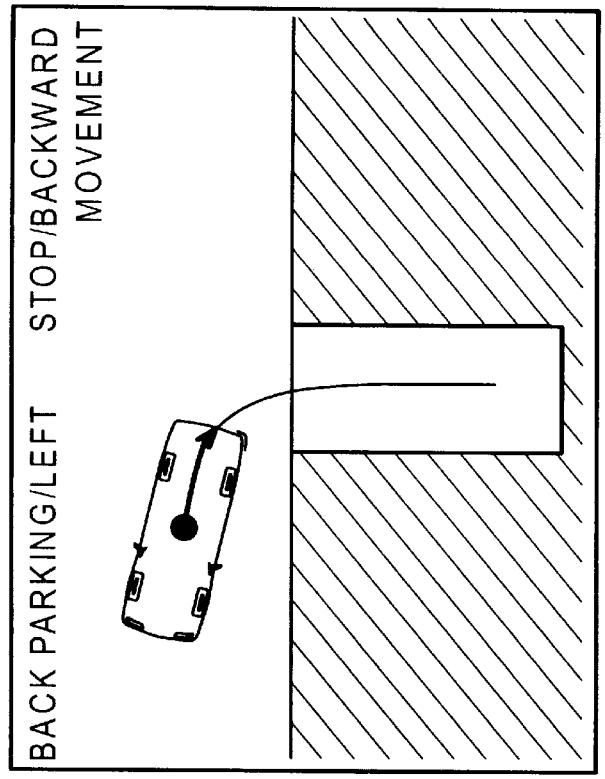
FIGS. 2E and 2F are illustrations for explaining the operation of "a stop/reverse stage" and "a stop/backward movement stage".

While the vehicle is being moved forwards toward a turning point, the current stage indicated on the operation-stage display device 11 is changed from "start/forward movement" to "forward movement/preparation for stopping of the vehicle", and the instructions "be careful so that a right front bumper does not contact with an obstacle" and "prepare for stopping the vehicle" are given from the speaker by the voice, as shown in FIG. 2D. When the vehicle has reached the turning point, the current stage indicated on the operation-stage display device 11 is changed from "forward movement/preparation of stop" to "top/reverse", and an instruction "stop the vehicle" and "bring the select lever to a reverse position" are given from the speaker by voice, as shown in FIG. 2E. The driver stops the vehicle and operates the select lever 10 from the "D" position to the "R" position based on these instructions. At this time, the vehicle may be moved past the turning point on the locus of movement and stopped at a position different from the turning point in some cases, depending upon the timing of braking operation provided by the driver. However, such an error has been stored, and will be corrected in a subsequent backward creep travel of the vehicle.

Figure 2F:
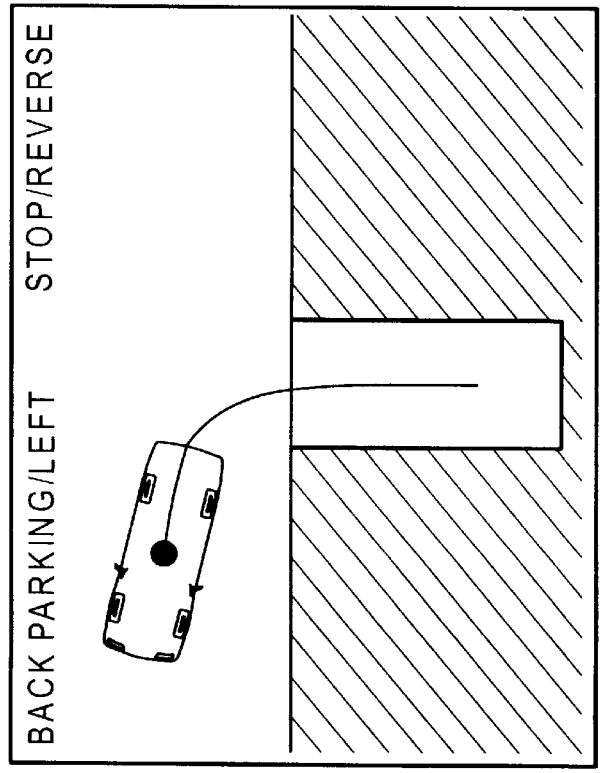

As shown in FIG. 2F, when the vehicle is stopped at the turning point, the current stage indicated on the operation stage display device 11 is changed from "stop/reverse" to "stop/backward movement", and a voice instruction "take off the brake to back the vehicle slowly" is given by speaker. When the driver releases the brake pedal 9 in response to this instruction, the vehicle moves in a backward creep travel along the locus of movement. During this time, an instruction "be careful so that a left rear bumper does not contact an obstacle" is given by voice from the speaker. Even in the case of backward creep travel, the front wheels Wf, Wf are automatically steered based on the data for the back parking/left mode, even if the driver does not operate the steering wheel 1, as in the above-described forward creep travel.

Figure 2H:
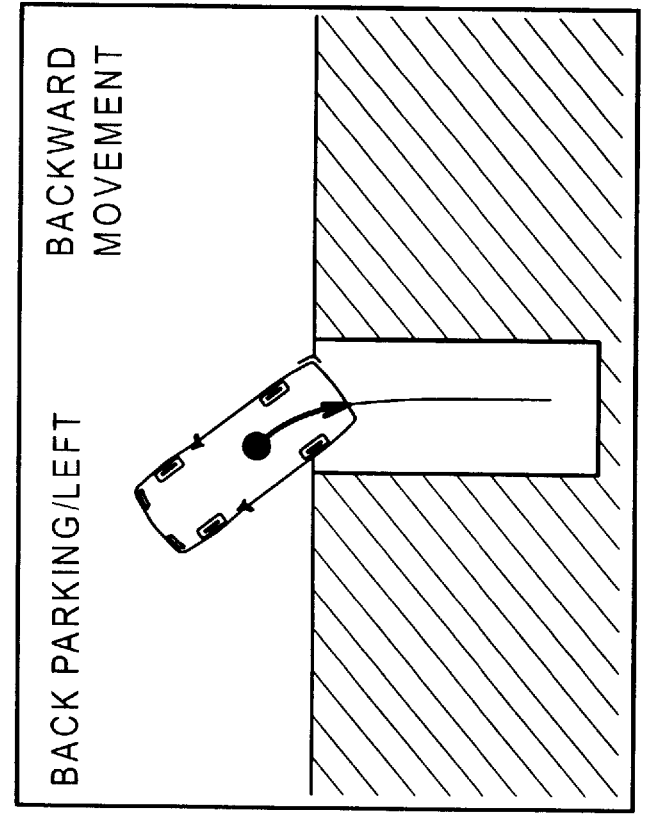
FIGS. 2G and 2H are illustrations for explaining the operation of "a backward movement stage".
Figure 2G:
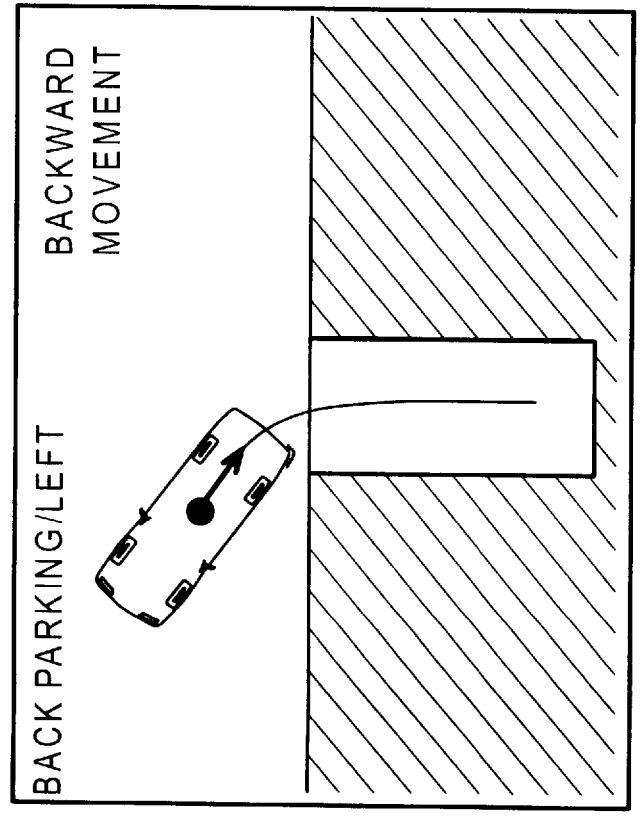
Figure 21:
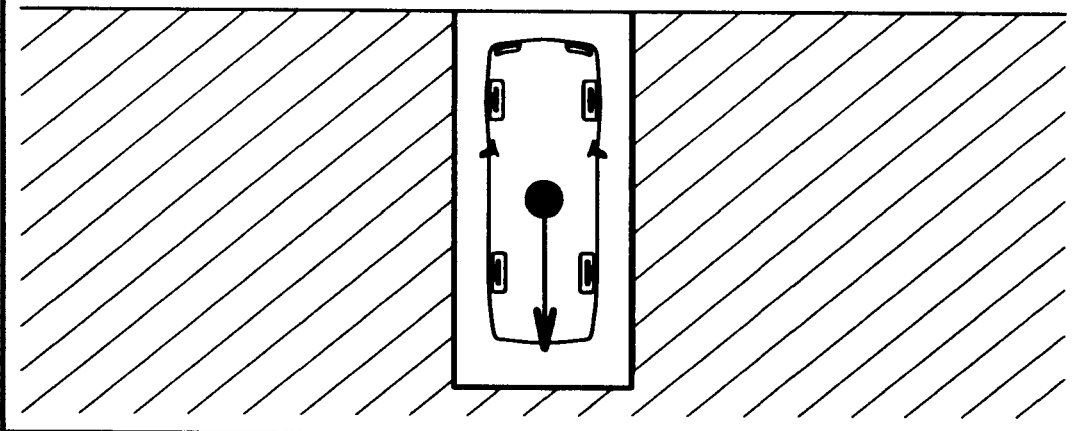

During the backward creep travel of the vehicle, the current stage is indicated as "backward movement" in the operation stage display device 11, and an instruction "be careful so that the left rear bumper does not contact an obstacle" or an instruction "be careful so that the right rear bumper does not contact the obstacle" is emitted by voice from the speaker, as shown in FIGS. 2G and 2H. When the vehicle has reached the stop position within the garage, the current stage is indicated as "completion/stop" in the operation stage display device 11, and a voice instruction "stop the vehicle" is emitted from the speaker, as shown in FIG. 2I. When the driver depresses the brake pedal 9 to stop the vehicle and operates the select lever 10 from the "R" position to the "P" position, the automatic parking control is completed, and the driver is informed of "the garaging has been completed" by the voice from the speaker.

The above described automatic parking control by the steering control unit 21 is canceled when the driver turns OFF the mode selecting switch $S_7$. Also, the automatic parking control is canceled in the following cases (1) to (3) and control is restored to the regular power-steering control.

(1) When the driver has released his foot from the brake pedal 9;

(2) When the driver has operated the steering wheel 1; and (3) When any of the object detecting means S6 has detected an obstacle. In the case (3), an automatic brake is operated to prevent the vehicle from coming into contact with an obstacle.

The case (1) when the driver has released his foot from the brake pedal 9 will be first described. The automatic parking control is carried out while the driver is depressing the brake pedal 9 to conduct creep driving. Therefore, when the driver has discontinued the braking operation, i.e., when the driver has released his foot from the brake pedal 9 to provide an operational amount detected by the brake operation detecting means $S_4$ which is equal to 0, or to provide a braking force low enough so the vehicle does not creep, the automatic parking control is canceled and restored to regular power-steering control.

In this way, by permitting the automatic parking control only in a state of a small amount of brake operation when the driver has his foot on the brake pedal 9, the brake operation can be conducted without a delay, when the driver tries to stop the vehicle because he has found an obstacle by himself during the automatic parking control. When the driver has abandoned the parking and has depressed the accelerator pedal during the automatic parking control, the automatic parking control is canceled when the driver releases his foot from the brake pedal 9 and hence, the need for the driver to turn OFF the mode selecting switch $S_7$ is eliminated, leading to an enhanced operability.

Next, the case (2) when the driver has operated the steering wheel 1 will be described. During the automatic parking control, it is unnecessary for the driver to operate the steering wheel 1, but the driver may be putting his hands on the steering wheel 1 to prepare for an emergency. When the driver has found an obstacle or the like during the automatic parking control and has operated the steering wheel 1 to keep away from the obstacle, the automatic parking control is canceled upon detection of a steering torque equal to or larger than a predetermined value by the steering torque detecting means $S_2$. In this way, by canceling the automatic parking control when the driver has operated the steering wheel 1, the interference between the driver's operation to keep away from the obstacle and the automatic parking control is prevented and thus, it is possible to smoothly keep away from the obstacle.

Finally, the case (3) when any of the object detecting means $S_6$ has detected an obstacle will be described. By continuously detecting an obstacle which is present around the vehicle by the eight object detecting means $S_6$, it is determined whether there is an obstacle positioned on a locus of movement of the vehicle. Further, with regard to a moving obstacle such as a small animal, it is determined whether there is a possibility that the locus of movement of the obstacle will enter the locus of movement of the vehicle. When it is determined that there is a possibility of contact of the vehicle with the obstacle, the brake actuator 12 is operated by a command from the control section 22 to automatically stop the vehicle.

When the automatic brake has been operated in the above manner, the operation of the automatic brake is canceled when the driver spontaneously depresses the brake pedal 9, whereby the amount of brake operation by the driver which is enough to stop the vehicle, is detected by the brake operation detecting means $S_4$. The operation of the automatic brake is also canceled when the driver operates the selecting lever 10 to the "P" position. Thus, the need for the driver to conduct a special canceling operation is eliminated, leading to enhanced operability, and the vehicle is prevented from being moved simultaneously with the canceling of the operation of the automatic brake.

Figure 4A:
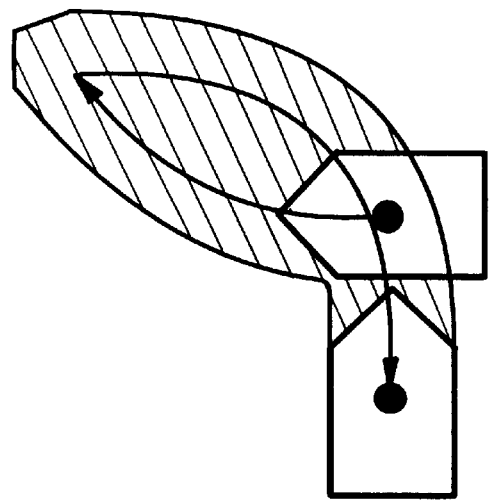
FIGS. 4A, 4B, and 4C are illustrations for explaining the operation of the second embodiment.
Figure 4B:
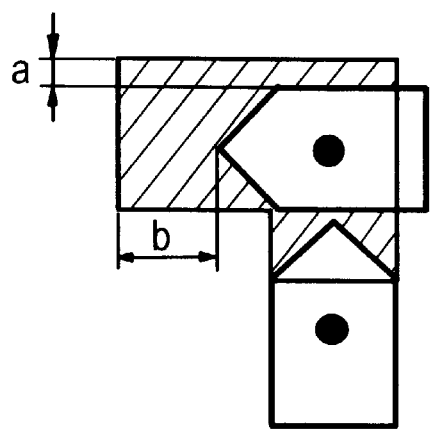
Figure 4C:
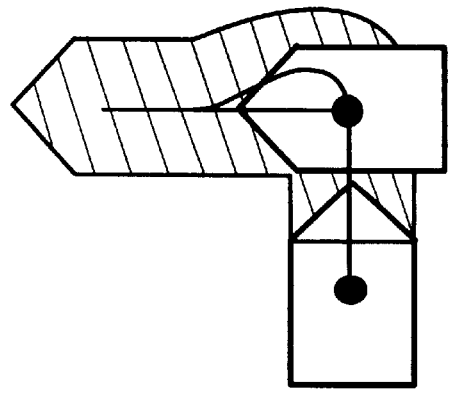

FIGS. 3 and 4A to 4C illustrate a second embodiment of the present invention. FIG. 3 is an illustration of the entire arrangement of a vehicle equipped with a front and rear wheel steering control system, and FIGS. 4A to 4C are diagrams for explaining the operation.

In the second embodiment, the present invention is applied to a front and rear wheel-steered vehicle in which front wheels Wf, Wf and rear wheels Wr, Wr can be steered, and which includes a steering actuator 7' for the rear wheels Wr, Wr in addition to a steering actuator 7 for the front wheels Wf, Wf.

When the front wheels Wf, Wf and the rear wheels Wr, Wr are independently steered, reference steering angles θref for the front wheels Wf, Wf and the rear wheels Wr, Wr are previously stored in the memory section 23, and the control section 22 controls the operations of both the steering actuators 7 and 7', so that the steering angles θ of the front wheels Wf, Wf and the rear wheels Wr, Wr are equalized to the respective reference steering angles θref.

When the steering angle θ of the rear wheels Wr, Wr is controlled in proportion to the steering angle θ of the front wheels Wf, Wf, only the reference steering angle θref for the front wheels Wf, Wf is previously stored, and the control section 22 controls the operation of the steering actuator 7, so that the steering angle θ of the front wheels Wf, Wf is equalized to the reference steering angle θref, and the control section controls the operation of the steering actuator 7', so that the steering angle θ of the rear wheels Wr, Wr is equalized to a value proportional to the reference steering angle θref.

As also shown in FIGS. 2A to 2I, the space required when the front wheel-steered vehicle in the first embodiment is parked in the back parking/left mode is the space as shown by drawing oblique lines in FIG. 4A.

The space required when the front and rear wheel-steered vehicle in the second embodiment is parked in the back parking/left mode is a small space as shown by drawing oblique lines in FIG. 4C. This is closely allied to a minimum space with the areas shown by a and b in FIG. 4B being reduced as much as possible.

In the second embodiment, a selecting means such as a switch, may be provided in the vicinity of a driver's seat, so that the driver can select a front wheel steering mode or a front and rear wheel steering mode, or the size of a parking space may be determined based on the result of detection by the object detecting means $S_6$, to thereby select a front wheel steering mode or a front and rear wheel steering mode in accordance with the size of the parking space.

As discussed above, according to a first aspect of the present invention, the control means, for controlling the steering actuator based on the contents stored in the memory means carries out control under the condition that the brake means is being operated. Therefore, when the driver has found an obstacle during the automatic parking control, the brake can be immediately operated to stop the vehicle, leading to greatly enhanced safety.

According to a second aspect of the present invention, the memory means stores the locus of movement of the vehicle as the steering angle of the wheels with respect to the distance of movement of the vehicle. Therefore, the given locus of movement can be ensured irrespective to the magnitude of the vehicle speed during the automatic parking control.

According to a third aspect of the present invention, the control means controls the steering actuator based on the steering operation provided by the driver, when the operation of the brake means is discontinued during the control of the steering actuator based on the contents stored in the memory means. Therefore, when the automatic parking control is canceled, control can pass to steering based on a driver's intention without any delay.

According to a fourth aspect of the present invention, the automatic steering system includes the object detecting means for detecting an object near the vehicle, and automatic vehicle-stopping means for automatically stopping the vehicle, when the object detecting means detects the object as an obstacle to the vehicle moving on the locus of movement. Therefore, it is possible to automatically avoid the contact of the vehicle with the obstacle during the automatic parking control.

According to a fifth aspect of the present invention, the automatic vehicle-stopping means is the brake means. Therefore, when the obstacle has been detected, the vehicle can be reliably stopped.

According to a sixth aspect of the present invention, the vehicle includes the automatic transmission, and the operation of the automatic vehicle-stopping means is canceled by the operation of the brake means or by shifting the automatic transmission to the parking position by the driver. Therefore, the vehicle can be prevented from moving at the time when the operation of the automatic vehicle-stopping means is canceled.

According to a seventh aspect of the present invention, the wheels steered are the front and rear wheels. Therefore, it is possible to make a small sharp turn of the vehicle and thus, it is easy to park the vehicle in a narrow space.

Although the embodiments of the present invention have been described in detail, it will be understood that the present invention is not limited to the above-described embodiments, and various modifications in design may be made without departing from the spirit and scope of the invention defined in claims.

I claim:

1. An automatic steering system for a vehicle, comprising:

a steering actuator for steering vehicle wheels based upon a steering operation provided by a driver;

a brake means which is operated by a brake command means operated by the driver;

a memory means for previously storing a locus of movement of the vehicle to a target position; and a control means coupled to said memory means and to said steering actuator, for controlling said steering actuator based upon the contents stored in the memory means when the steering operation is not provided by the driver, and when said brake command means is being operated.

2. An automatic steering system for a vehicle according to claim 1, wherein said memory means stores the locus of movement of the vehicle as the steering angle (θ) of the wheels with respect to a distance of movement of the vehicle.

3. An automatic steering system for a vehicle according to claim 1 or 2, wherein said control means controls said steering actuator based upon the steering operation provided by the driver, when the operation of the brake command means is stopped during the controlling of said steering actuator based upon the contents stored in said memory means.

4. An automatic steering system for a vehicle according to claim 1 or 2, further including object detecting means for detecting an object near the vehicle, and an automatic vehicle-stopping means which automatically operates said brake means for automatically stopping the vehicle, when an obstacle is detected by said object detecting means.

5. An automatic steering system for a vehicle according to claim 4, wherein the vehicle includes an automatic transmission, and the operation of said automatic vehicle-stopping means is canceled by operation of said brake command means by the opposite of the driver, or by shifting said automatic transmission to a parking position.

6. An automatic steering system for a vehicle according to claim 1 or 2, wherein said wheels which are steered are front and rear wheels.

* * * * *